United States Patent

[11] 3,598,275

| [72] | Inventor | Edgar Francois |
| | | Wayne, N.J. |
| [21] | Appl. No. | 826,649 |
| [22] | Filed | May 21, 1969 |
| [45] | Patented | Aug. 10, 1971 |
| [73] | Assignee | Uniroyal, Inc. |
| | | New York, N.Y. |

[54] RADIAL-FILAMENT CYLINDERS
10 Claims, 23 Drawing Figs.

[52] U.S. Cl. ................................................ 220/9 A,
114/16 R, 161/59, 220/9 F, 220/83
[51] Int. Cl. .................................................. B65d 25/18
[50] Field of Search............................................ 114/16, 0.5;
220/9 A, 9 F, 83, 3, 5 A; 161/160, 161, 59, DIG. 4

[56] References Cited
UNITED STATES PATENTS

| 3,228,550 | 1/1966 | Krenzke | 220/3 |
| 3,329,297 | 7/1967 | Jordan | 220/3 X |
| 3,400,848 | 9/1968 | Shaler et al. | 220/5 A |
| 2,762,739 | 9/1956 | Weiss | 161/161 |
| 3,124,001 | 3/1964 | Conley | 220/83 X |
| 3,158,383 | 11/1964 | Anderson et al. | 220/9 (F) X |
| 3,317,074 | 5/1967 | Barker, Jr. et al. | 220/9 (F) |
| 3,317,367 | 5/1967 | Koller | 161/160 X |
| 3,462,340 | 8/1969 | Hough | 161/59 |

Primary Examiner—Joseph R. LeClair
Assistant Examiner—James R. Garrett
Attorney—Norbert P. Holler ABSTRACT: Hollow cylindrical bodies, the walls of which include a shell construction made of resin reinforced by short length, high modulus filaments extending substantially normal to the inner and outer shell surfaces, i.e. generally radially, are disclosed. The body wall may be composed of a single such shell reinforced by internal coaxial stiffening rings distributed along its length, or it may be composed of a sandwich structure consisting of a pair of identically constructed concentric shells with a low density core confined therebetween. Such bodies, when closed at their opposite ends by means of end caps, are particularly suited for use as deep submergence vessels, being characterized by high resistance to external hydrostatic pressures, a low weight-to-displacement ratio, and high compressive strength and elastic stability. Various methods of constructing such bodies are also disclosed.

PATENTED AUG 10 1971

INVENTOR.
EDGAR FRANCOIS
BY Norbert P. Holler
ATTORNEY

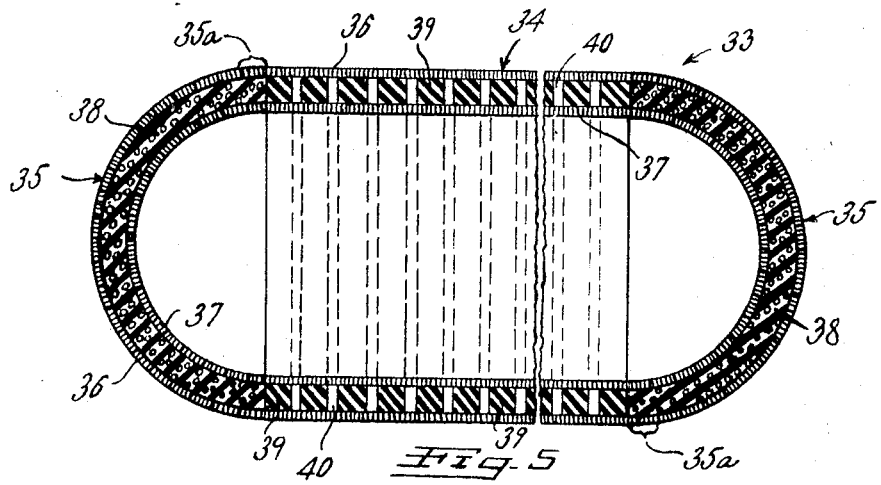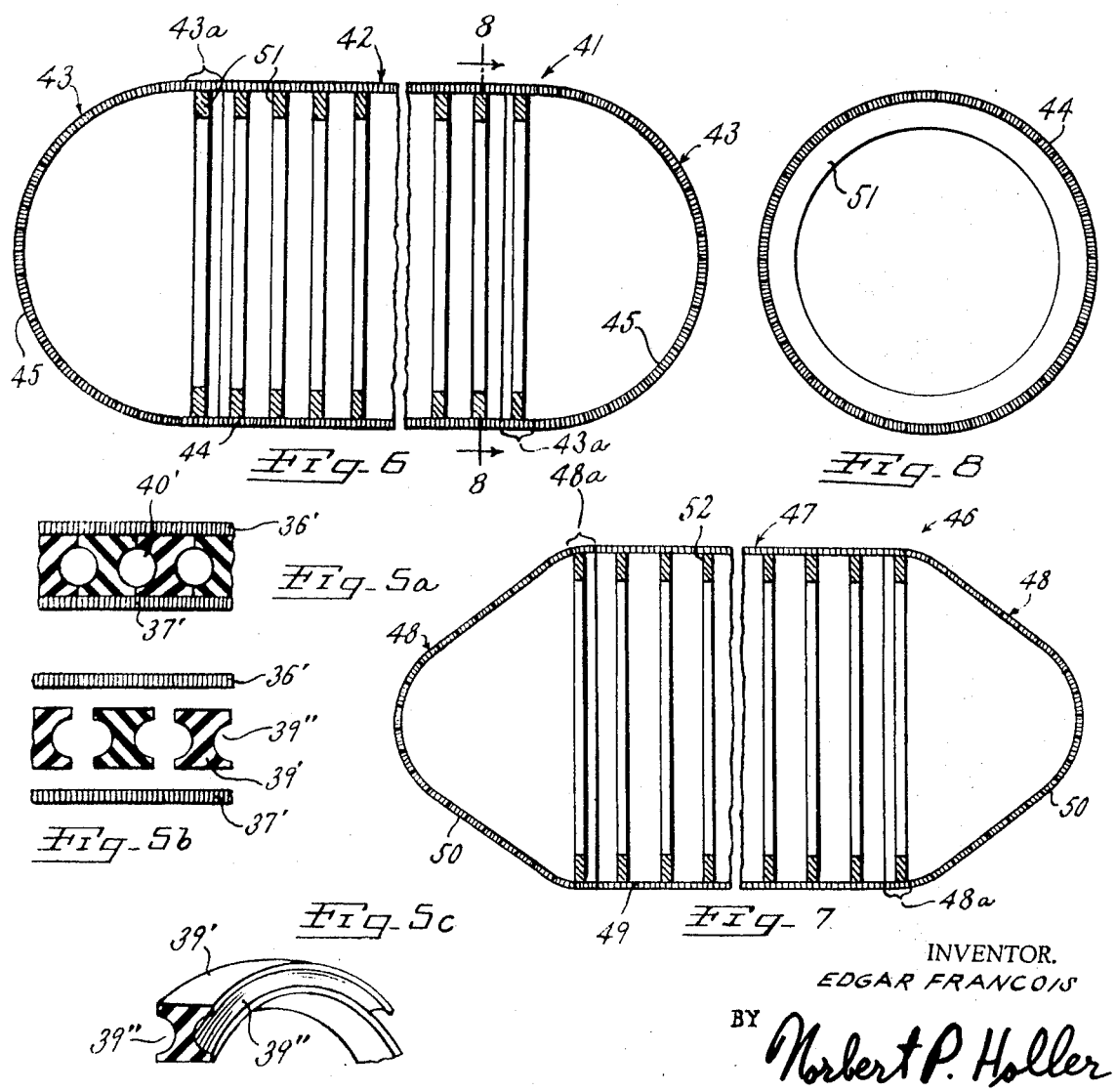

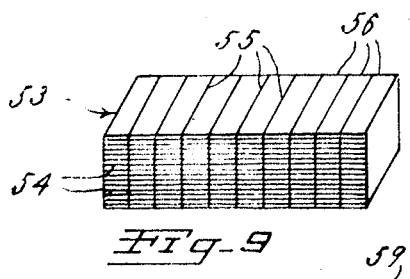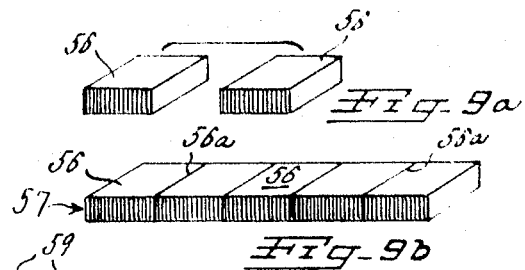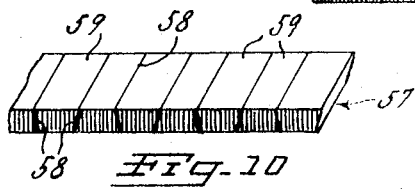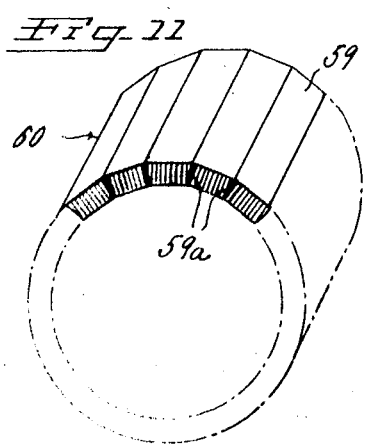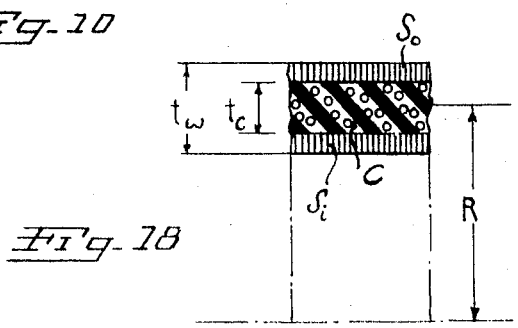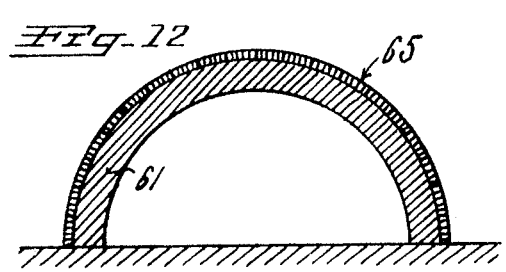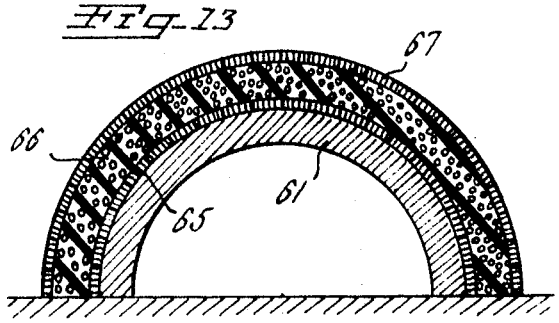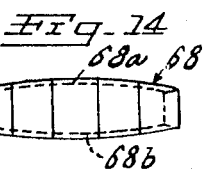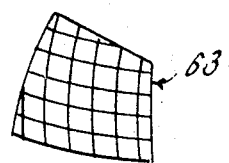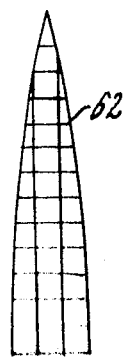

RADIAL-FILAMENT CYLINDERS

This invention relates to hollow shell-type bodies made of filament-reinforced resin and suitable for use in deep submergence applications such as underwater research and exploration, detection of and defense against submarines, etc.

Hollow vessels capable of withstanding extremely high external pressures are in great demand for antisubmarine warfare as well as for oceanographic and various other types of underwater research and exploration, to serve as the load-carrying envelopes for underwater structures, as vehicles for men and/or instruments, and as buoyant elements for attachment to underwater vehicles. It is well known that metal shells can be constructed to provide the strength and resistance to buckling under the tremendous compressive stresses to which they are subjected at great depths below the surface of the water. Such metallic vessels are severely limited in effectiveness, however, by their high weight-to-displacement ratios, due to the fact that at wall thicknesses sufficient to meet the strength and elastic stability requirements, vessel weight becomes excessive. Supplementary buoyancy means must be provided, therefore, increasing the bulk and decreasing the maneuverability of the vessels.

Spherical vessels constructed of radial filament-reinforced resin and characterized by low weight-to-displacement ratios and by high strength and elastic stability at low wall thickness, are disclosed in the copending application of Daniel R. Elliott et al., Ser. No. 522,675, filed Jan. 24, 1966, now U.S. Pat. No. 3,490,638, issued Jan. 20, 1970 and assigned to the same assignee as the instant application, and entitled "Radial-Filament Spheres." For a number of uses and situations, however, such factors as size, hydrodynamic stability, minimization of drag, etc., may dictate the utilization of a basically cylindrical body shape rather than that of a sphere.

The fundamental object of the present invention, therefore, is to provide cylindrical deep submergence vessels capable of withstanding high external hydrostatic pressures, possessed of relatively high ratios of compressive strength to weight and of elastic stability to weight and a relatively low ratio of weight to displacement, and having a high payload capability.

Generally speaking, the objectives of the present invention may be realized by the provision of a cylindrical vessel wall construction including a shell composed of filament-reinforced resin in which all the individual filament lengths are oriented substantially normal to the shell surfaces, and in which the wall of the cylindrical body portion of the vessel can be in the form of a single shell reinforced by a suitable arrangement of internal stiffening rings or in the form of a sandwich construction composed of a low density core confined between two such shells in concentric relationship.

The foregoing and other objects, characteristics and advantages of the present invention will be more clearly understood from the following detailed description of preferred embodiments thereof when read in conjunction with the accompanying drawings, in which:

FIG. 5 is a longitudinal section through a radial-filament cylinder construction of the same shape as that shown in FIG. 1 but utilizing a different type of core in the main body portion;

FIG. 5a is a fragmentary sectional illustration of a modified form of the body wall construction shown in FIG. 5;

FIG. 5b is an exploded view of the structure shown in FIG. 5a;

FIG. 5c is a fragmentary perspective view of an element of the structure shown in FIGS. 5a and 5b;

FIGS. 6 and 7 are longitudinal sections, analogous to FIGS. 1 and 4, through radial-filament cylinder constructions according to still other aspects of the present invention;

FIG. 8 is a sectional view taken along the line 8—8 in FIG. 6;

FIG. 9 is a perspective view of a large block of unidirectional filament-reinforced resin which can be employed as the basic starting material for the construction of the shells for radial-filament cylinders in accordance with the present invention;

FIGS. 9a and 9b are similar views illustrating, respectively, severed parts of the block of FIG. 9 and their reassembly into a relatively thin unidirectional filament slab;

FIG. 10 is a fragmentary perspective illustration of the slab of FIG. 9b and indicates transverse oblique cuts made therein as a part of one method of constructing the cylindrical shells according to the present invention;

FIG. 11 is a perspective illustration of a cylindrical shell built up of elements of the cut slab shown in FIG. 10;

FIGS. 12 and 13 are axial sectional views illustrating the building of radial-filament end caps for the radial-filament cylinders according to the present invention;

FIGS. 14, 15, 16 and 17 are plan views of built-up intermediate structural members which may be employed in building up such end caps; and FIG. 18 is an enlarged, fragmentary, longitudinal sectional view of a radial-filament cylinder according to the present invention and diagrammatically illustrates a multilayer or sandwich wall construction therefor and some of the physical parameters involved.

Figure 1:
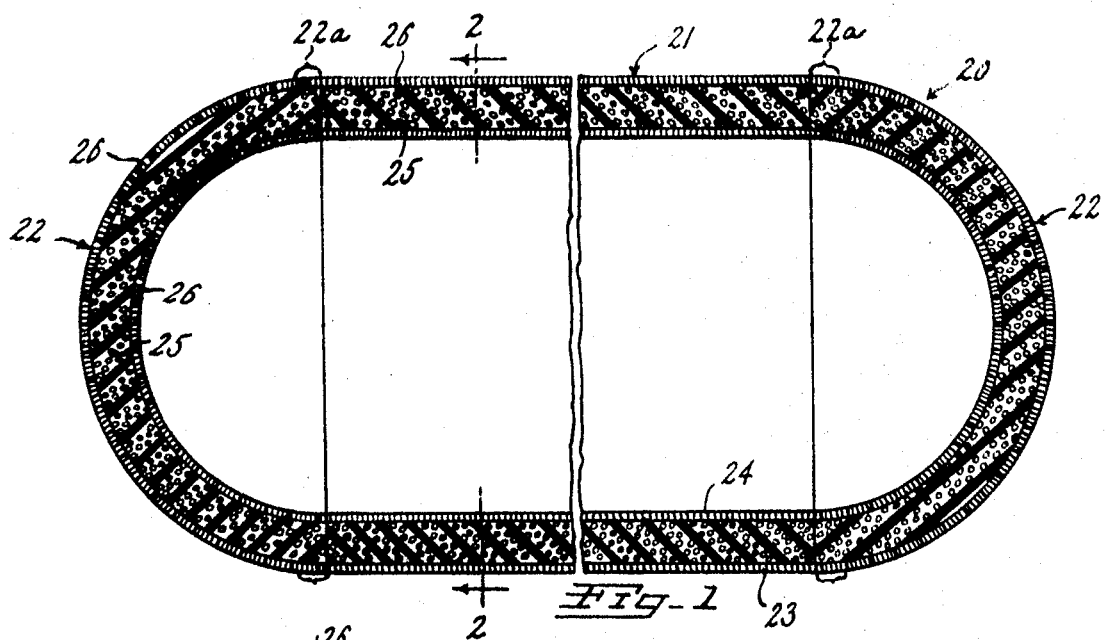
FIG. 1 is longitudinal section through a radial-filament cylinder according to one aspect of the present invention.

In a closed end, hollow, cylindrical vessel subjected to external hydrostatic pressure over its entire surface, the external pressure is opposed by circumferential and axial compressive stresses in the wall of the vessel. Any given element of the wall of such a vessel can thus be considered as being subjected to two coplanar perpendicular compressive stresses, both essentially parallel to the inner and outer wall surfaces. The ratio of circumferential to axial stress in such a cylindrical vessel under external hydrostatic pressure is exactly 2:1, independent of the shape of the end closures for the cylinder, and the magnitude of these principal stresses are given by the following equations, $$\sigma_a = PR/2t \quad (1)$$
$$\sigma_c = PR/t \quad (2)$$

where $\sigma_a$ is the axial stress, $\sigma_c$ is the circumferential stress, $P$ is the unit external pressure, $R$ is the mean radius of the cylinder, and $t$ is the wall thickness of the cylinder. If, now, each such element of the vessel wall is in the form of a shell composed of a unidirectional filament slab in which all the filament lengths are oriented normal to the plane of application of the principal compressive stresses, i.e. substantially radially of the cylinder, the fibers in each element of the shell will be subjected not only to the said compressive stresses in directions perpendicular to the filaments, but also to tensile stresses in the filament direction. This will be readily understood from the fact that at significant submergence pressures, the principal compressive wall stresses given by equations (1) and (2) far exceed the yield strength of the resin matrix per se. However, flow of the resin radially outwardly and inwardly of the cylinder from between the filaments is prevented by shear stresses at the filament/resin interfaces. The entire resin-extruding force is, therefore, carried by the filaments, resulting in a filament tensile stress.

It can be shown that the buckling or collapse pressure $P_c$ for a long cylindrical shell of wall thickness $t$ and mean radius $R$ is given by the following equation, $$P_c = \frac{Et^3}{4R^3(1-\nu^2)} \quad (3)$$

where $E$ is the transverse modulus of elasticity of the wall material, and $\nu$ is Poisson's ratio for the shell. Since the moment of inertia per unit width of the shell wall about its center is $$I = t^3/12 \quad (4)$$

equation (3) may be written as $$P_c = \frac{3EI}{R^3(1-\nu^2)} \quad (5)$$

in which the term "$EI$" represents the flexural rigidity per unit width of the wall. In the case of a radial-filament cylinder utilizing a sandwich wall construction including a pair of concentric shells $S_i$ and $S_o$ and an intermediate low density resin core $C$ (see FIG. 1B), the modified flexural rigidity $(EI)_{sw}$ of the sandwich wall may be expressed, provided the construction is symmetrical about its center, as $$(EI)_{sw} = E_w \left( \frac{t_w^3 - t_c^3}{12} \right) + E_c \left( \frac{t_c^3}{12} \right) \quad (6)$$

where $R$ is the mean radius of the cylinder, $t_w$ is the thickness of the wall, $t_c$ is the thickness of the core, $E_w$ is the modulus of elasticity of the wall material, and $E_c$ is the modulus of elasticity of the core material. Substituting for $EI$ in equation (5), the collapse pressure $(P_c)_{sw}$ for a radial-filament sandwich cylinder is seen to be $$(P_c)_{sw} = \frac{3\left[E_w \left( \frac{t_w^3 - t_c^3}{12} \right) + E_c \left( \frac{t_c^3}{12} \right)\right]}{R^3(1-\nu^2)} \quad (7)$$

which may be rewritten as $$(P_c)_{sw} = \frac{E_w(t_w^3 - t_c^3) + E_c(t_c^3)}{4R^3(1-\nu^2)} \quad (8)$$

to yield an expression of the same form as equation (3). The core actually contributes very little to the overall structural stability, as will be appreciated from the fact that since the modulus of the core of such a sandwich cylinder construction is approximately one-tenth the modulus of the inner and outer radial-filament shells, the last term in equation (8) is relatively negligible. The core is nevertheless an important component of the sandwich construction, since it enables the total wall thickness to be materially increased without a proportionate increase in weight, while at the same time serving to transmit stress from the outer shell to the inner shell. The core itself, being primarily a low strength resin, sustains only a small pressure drop.

Deep submergence vessels are also generally characterized by a figure of merit $M$ which is defined by the relation $$M = W/D \quad (9)$$

where $W$ is the weight of the vessel, and $D$ is the weight of water displaced thereby. For a given value of the critical pressure for buckling, the quantity $W/D$, which is the weight-to-displacement ratio, is related to the nature of the material of which the cylindrical vessel is made by the proportionality $$\frac{W}{D} \sim \frac{\rho}{\sqrt[3]{E}} \quad (10)$$

where $\rho$ is the density of the wall material. It will be evident that a low value for the ratio $W/D$ represents a large payload capability for the vessel, and from equations (3) and (8) that the wall thickness $t$ or $t_w$ should be in direct proportion to the mean radius of the vessel, so that vessels of different sizes will have the same pressure capabilities.

From equations (3) to (10) it can be seen, therefore, that for a cylinder of a given size and intended for a specified critical pressure, better performance (lower $W/D$) is a function of both a higher transverse modulus of elasticity, which permits a decreased wall thickness, and a lower density. Effective implementation of the principles of the present invention thus makes it preferable to use unidirectional fiber and resin building elements wherein both the resin and the fiber components are of high modulus, since both contribute to the transverse modulus of the composite element. Nevertheless, it will be understood that other factors, e.g. permissible density, weight, etc., may place limitations on the choice of resin and/or fiber for the elements.

Merely by way of example, it has been found that excellent results are achieved by using glass filaments (having a modulus in the range of about 10,000,000 to 12,500,000 p.s.i.) as the fiber component in a resin matrix composed of an epoxy resin system. Alternatively, the fiber component of the building elements may include asbestos fibers (modulus in the range of about 24,000,000 to 25,000,0000 p.s.i.), boron filaments (modulus in the range of about 50,000,000 to 60,000,000 p.s.i.), carbon filaments (modulus in the range of about 20,000,000 to 70,000,000 p.s.i.), sapphire whiskers, tungsten whiskers, etc. The resin component may be such epoxy resin systems as are marketed by Union Carbide Corporation under the designations "ERL-2256" (modulus about 500,000 p.s.i.), "ERRA-0300" (modulus about 720,000 p.s.i.) and "EP-2114" (modulus about 1,030,000 p.s.i.), as well as other epoxies, and various other resins such as phenolics, melamines, and the maleic alkyd/styrene copolymer types of polyester resins, characterized by relatively high modules and/or relatively low density. It should be noted that the starting uncured unidirectional filament and resin material, which is used to make the basic building elements for the cylindrical shells of the present invention, generally is relatively resin-rich (resin about 35 to 50 percent to the total volume) and thus has a maximum filament content of about 65 percent. Advantageously, however, the filament content should be above about 65 percent and preferably in the range of about 75 to 90 percent of the total volume of the shell wall. This condition can be readily achieved by squeezing out some of the resin from the uncured material prior to the curing thereof. As will be understood, with a higher filament content in the shell wall, the shell can withstand higher external hydrostatic pressures. In this connection, it should be pointed out that the upper end of the filament content range set forth above is not intended to be an invariable limitation and may be exceeded as long as the resultant filament/resin laminate retains its cohesiveness.

The core is advantageously a rigid, low density structure composed of molded resinous or polymeric material. According to the preferred aspects of the present invention, the core is made of syntactic foam, e.g. an epoxy, polyurethane, epoxy/polyamide or epoxy/polyurethane composition admixed with a low specific gravity filler such as glass microspheres (sodium borosilicate glass spheres with an average particle size of 65 microns and a specific gravity of 0.35). Other resin matrices and other fillers, e.g. phenolic, epoxy or metal microspheres, glass microtubes, etc., may also be used. Alternatively, the core may be composed of unfilled resin with its density reduced by the provision of suitably arranged voids therein, preferably in the form of annular "circumferential holes," the core in this case being composed essentially of a number of closely spaced rings.

Figures 2, 3:
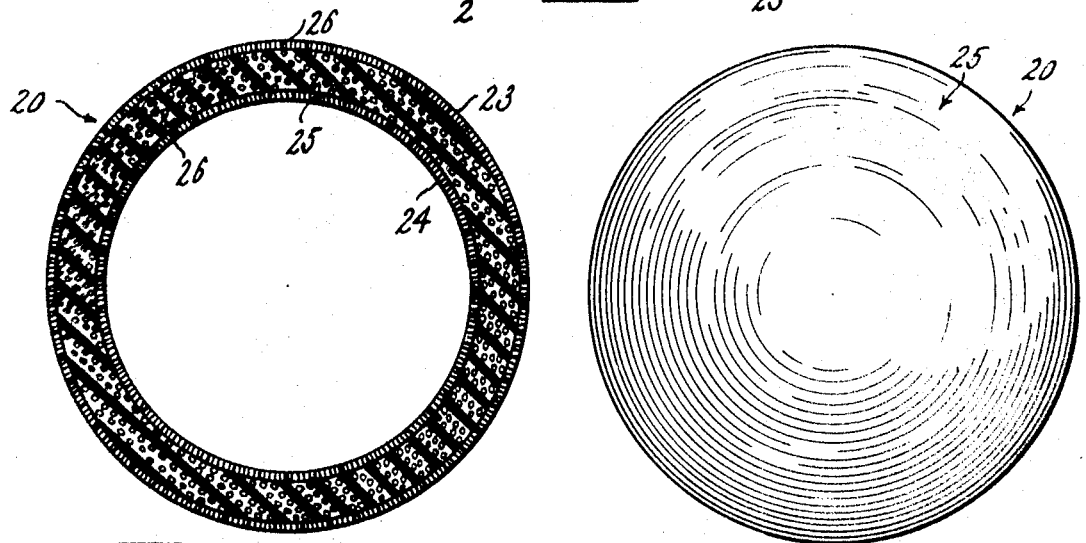
FIG. 2 is a sectional view taken along the line 2—2 in FIG. 1.
FIG. 3 is an end elevational view of the cylinder shown in FIG. 1.

Referring now to the drawings in greater detail for illustrations of some cylindrical vessel constructions embodying the principles of the present invention, the vessel 20 shown in FIGS. 1 to 3 as having a main body portion 21 and a pair of essentially hemispherical end caps 22, is characterized by a wall in the form of a sandwich construction consisting of outer and inner concentric shells 23 and 24 and a low density rigid syntactic foam core 25 filling the space therebetween. In both the main body portion 21 and the end caps 22, the shells 23 and 24 are constructed of a unidirectional fiber-reinforced resin, with the individual filament lengths 26 all extending substantially normal to the inner and outer surfaces of the respective shells and in each shell from one surface thereof to the other. The filaments will thus be seen to be oriented substantially radially of the cylinder in the main body portion 21 thereof and substantially radially of a respective sphere in each of the end caps 22. The core 25 may, of course, be made of other types of foams, including chemically blown or frothed cellular polymer foams, rather than of syntactic foam, subject only to the requirement that the rigid foam have the physical properties required for the use to which it is to be put.

It will be understood that some precautions must be taken in any such construction to avoid the occurrence of strain discontinuities at the junctures between the main body portion 21 and the end caps 22. At equal moduli of the respective wall structures, such strain discontinuities would result due to the presence of a discontinuity of curvature existing by virtue of the abrupt transition from the cylindrical to the hemispherical curvature. One way of minimizing this potential defect would be to make provision for a gradual transition in curvature, for example by constructing the end caps so as to have, at their equatorial regions, small portions 22a of cylindrical or almost cylindrical configuration. Another way would be to make provision for the modulus of the composite sandwich wall 23-24-25 in each of the hemispherical end caps 22 to be less than the modules of the composite sandwich wall in the cylindrical main body portion 21, generally about one half as large, to compensate for the fact that at equal moduli, the strain in the cylindrical body portion would be greater than that in the end caps. The differential in modulus values may be effected by suitably adjusting either the resin modulus or the volume loading of glass in the shells. Most advantageously and in accordance with the preferred aspects of the present invention, an optimum combination of both of these approaches would be used, to provide for a gradual transition in curvature as well as for appropriately adjusted modulus values.

Figure 4:
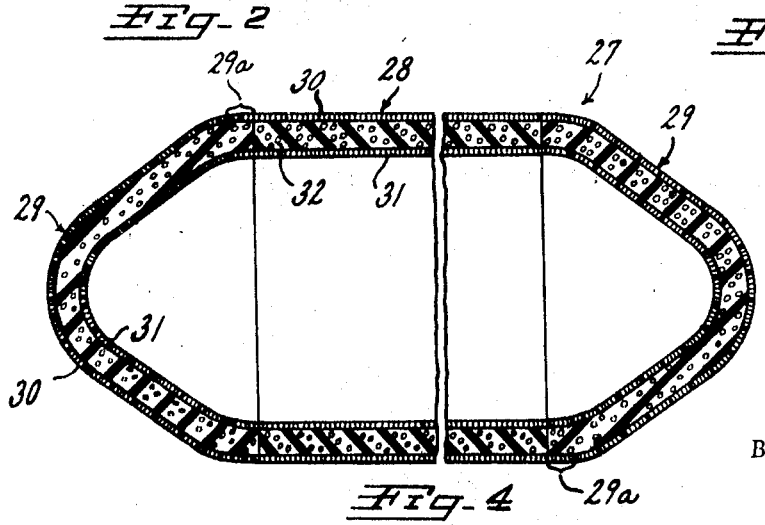
FIG. 4 is a longitudinal section through a radial-filament cylinder construction similar to that shown in FIG. 1 but with differently shaped end caps.

The vessel 27 shown in FIG. 4 as including, like that shown in FIGS. 1 and 2, a main cylindrical body portion 28 and end caps 29, utilizes an identical wall construction composed of outer and inner unidirectional filament-reinforced resin shells 30 and 31 and a rigid low density, preferably syntactic foam, core 32 therebetween. The principal difference between the vessels 20 and 27 is that the end caps of the latter are shaped in the manner of a nose cone or prolate spheroid rather than a hemisphere. As in the case of the end caps 22, of course, the potential existence of strain discontinuities at the junctures is avoided by the provision of a small cylindrical or almost cylindrical edge region 29a on each end cap and by a suitable adjustment of the modulus of the composite wall construction in the end caps 29 to be less than that of the composite wall construction in the main cylindrical body portion 28 (the difference here will be somewhat different that in the case of the hemispherical end caps, generally less than that).

The sandwich wall construction for the cylindrical body portion of a vessel of the class contemplated by the present invention may, in lieu of a foam type of core, utilize a core the requisite low density of which is effected in a different manner. Merely by way of example, in the vessel 33 shown in FIG. 5, which again has the same shape as the vessel 20 of FIGS. 1 to 3, being provided with a main cylindrical body portion 34 and a pair of hemispherical end caps 35 with small cylindrical or almost cylindrical transition regions 35a, all composed of a pair of concentric outer and inner radial-filament shells 36 and 37 with a low density core encased therebetween, and with the core 38 in the end caps shown as made of syntactic foam, the core in the cylindrical body portion 34 is shown as made of a plurality of coaxial resin rings 39 of square or rectangular cross section separated from one another by rectangular spaces 40. In this construction, therefore, the density of the core is reduced by the provision of a plurality of circumferential "holes" therein. An alternative construction, wherein the circumferential "holes" 40' are of circular cross section, is illustrated in FIG. 5a, these holes being defined by an assembly of rings 39' (FIGS. 5b and 5c) between the outer and inner radial-filament shells 36' and 37', each provided with a pair of semicircular recesses 39" in is opposite sides. These constructions are, of course, usable in the body of a vessel with prolate spheroid-shaped end caps as well, and other ways of achieving the indicated low density of the core will also readily suggest themselves to those skilled in the art.

Although the so far described dual shell sandwich wall constructions are found to be the most advantageous from the standpoint of the strength and elastic stability obtainable at the desired weight-to-displacement ratio, the principles of the present invention may also be incorporated in cylindrical vessels characterized by single shell wall constructions, such as are illustrated in FIGS. 6, 7, and 8. Thus, the vessel 41 shown in FIG. 6 comprises a cylindrical main body portion 42 and a pair of hemispherical end caps 43 with cylindrical or almost cylindrical edge regions 43a, the vessel wall being composed of single shells 44 and 45 of radial-filament reinforced resin, whereas the vessel 46 shown in FIG. 7 comprises a main body portion 47 and a pair of prolate spheroid or nose cone-shaped end caps 48 with cylindrical or almost cylindrical edge regions 48a, the entire vessel wall being composed of single shells 49 and 50 of radial-filament reinforced resin. In any such construction, however, it is deemed advisable, in order to assure attainment of the desired elastic stability of the shell, to provide a plurality of stiffening rings 51 or 52 internally of the main body portion of the vessel. It is preferred to employ stiffening rings made of filament-reinforced resin, but rings of other materials such as metal might be used under certain conditions, the basic requirement to be observed being that the rings must provide sufficient rigidity to prevent buckling of the shell and of the rings themselves. It will be understood that the ring spacing will be determined for any given vessel in accordance with the intended working depth of that vessel, so as to prevent the shell wall portions overlying the spaces from failing by virtue of the shear stresses to which they will be subjected relative to the shell wall portions overlying the stiffening rings. Thus, the higher pressures to be encountered at greater depths will dictate the use of at least a closer spacing of the rings, and possibly also the provision of thicker and stronger rings, than would the lesser pressures to be encountered at points closer to the surface. No stiffening rings are required in the end caps, but as before, suitable adjustments of the modulus of the end cap filament/resin material will have to be made.

It will be apparent, of course, that the ports and access hatches, along with suitable hardware to permit opening and closing and with appropriate seals to prevent leakage, may be arranged at suitable locations in any of the various radial-filament cylindrical vessels according to the present invention, the openings for such ports and hatches being formed by radial cuts as described in the aforesaid Elliott et al. application.

My presently preferred method of constructing the main body portions of the wall shells for radial-filament cylinders according to the present invention entails a series of steps which are in essence the same as the initial steps of the "barrel" method of building radial-filament spheres disclosed in the aforesaid Elliott et al. application. This method employs as the starting material a block 53 of unidirectional, resin-bonded filaments 54 (FIG. 9), of appropriate transverse dimensions, in which the filaments run lengthwise of the block. The block is cut in planes transverse to the filament direction, as indicated by the lines 55, into a plurality of relatively thin strips 56 which are then laid on their sides (FIG. 9a), assembled in side-by-side relation (FIG. 9b), and cemented to one another at their abutting edges 56a to form a thin panel 57. It will be understood that the thickness of each of the strips 56 cut from the block 53 will be equal to the desired wall thickness of the ultimate cylindrical shell body.

The flat panel 57, having all the short filament lengths 54 now oriented normal to its broad faces, is then severed along paired opposite oblique planes, as indicated by the lines 58 (FIG. 10), to provide a plurality of relatively narrow strips 59 of essentially trapezoidal cross section. These strips are then separated and, with alternate ones inverted, are reassembled (preferably on a suitable mandrel, not shown) and cemented along their abutting faces 59a (FIG. 11), resulting in the formation of a right circular cylindrical shell 60 having all the individual filament lengths oriented perpendicularly to the inner and outer surfaces of the shell. Although the entire shell may be so formed in a one-stage operation, it may also be formed in several stages if that be found advantageous for any particular reason. Thus, and merely by way of example, enough strips 59 may be employed to form a number of cylindrical sectors, each of the desired arc length, e.g. 90°, 180°, or any other, as indicated in solid lines in FIG. 11, and a sufficient number of such sectors can then be assembled and cemented to each other in side-by-side relation and the cement cured to form the completed cylindrical shell (as indicated in phantom outline in FIG. 11). It should be understood that the strips 59 are drawn to a greatly enlarged scale in FIG. 11 and that actually the strips must be sufficiently narrow to ensure that, even though they are flat-surfaced, the overall cylindrical shell will be as round-surfaced as possible.

In the building of a dual shell sandwich cylinder, the preferred procedure is first to mold the core to somewhat larger than the desired final dimensions, taking account of the expected shrinkage of the resin during the curing thereof, and then to machine the core to cylindrical shape with precise inner and outer diameters. The two radial-filament shells can then be built up directly on the inner and outer surfaces of the core, i.e. without the use of a mandrel, the individual strips being cemented to the core as well as to one another by any suitable, preferably room temperature curing, thermosetting resin, e.g. an epoxy resin system.

The hemispherical end caps for single shell cylindrical vessels according to the present invention may be built up in any of the various ways of making spherically curved shells disclosed in the aforesaid Elliott et al. application, and reference may be had to that application for details of those methods. Generally, however, the various methods there designated as the "half-lune" method, the "1/3 octant" method, and the "-strip" method entail the use of a substantially hemispherical mandrel 61 (FIG. 12) on which the respectively appropriate unidirectional filament/resin building elements 62 (FIG. 15), 63 (FIG. 16) or 64 (FIG. 17) are assembled and cemented together with other like elements to final form, designated 65 in FIG. 12. The building of a sandwich shell, of course, will normally require that the core 66 (FIG. 13) be premolded, machined to size, and placed and cemented directly onto the shell 65, after which another shell 67 is built up about and cemented to the outer surface of the core.

Alternatively, the single hemispherical shells may be built up by the method designated the "barrel" method in the Elliott et al. application. In this method, after the formation of each coherent cylindrical sector, such as is illustrated in solid lines in FIG. 11, the same is severed into a plurality of arcuate strips 68 (FIG. 14) of trapezoidal cross section by means of suitable paired oblique planar cuts (not shown) through the sector in the circumferential direction thereof, with the paired planes of cutting, i.e. the sides 68a—68b of each strip 68, being so oriented as to intersect at the axis of curvature of the cylindrical sector. These strips 68 are then assembled and cemented to each other in side-by-side relation (after removal of waste material) to form a spherically curved shell. A sandwich shell utilizing this method can then be built in the manner described above with respect to FIG. 13.

The application of the foregoing constructional principles of the building of prolate spheroid end caps will readily suggest itself to those skilled in the art, requiring only appropriate modification to take into account the different shape and curvature characteristics of such end caps. It will also be apparent that, by the same token, still other end cap shapes, e.g. flat plates, could be used if desired.

It will be understood that the foregoing description of preferred embodiments of the present invention is for purposes of illustration only, and that the various structural features and relationships, as well as the types, ranges and proportions of component materials, herein disclosed are susceptible to a number of modifications and changes none of which entails any departure from the spirit and scope of the present invention as defined in the hereto appended claims.

Having thus described my invention, what I claim and desire to protect by Letters Patent is:

1. A generally cylindrical, hollow shell-type body, the wall structure of said body comprising a pair of cylindrical shells made of resin reinforced by short length filaments, the individual filament lengths in each shell extending substantially normal to the inner and outer surfaces of that shell, the two shells being of different diameters and being located one concentrically within the other and coextensive therewith, and a rigid, low density core of polymeric material occupying the annular space between said shells over the entire length thereof.

2. A body according to claim 1, said individual filament lengths in each shell extending from the inner to the outer surface of that shell.

3. A body according to claim 1, said core being made of syntactic foam.

4. A body according to claim 1, said core being provided with a plurality of holes therein.

5. A body according to claim 1, said core being provided with a plurality of circumferential holes therein, imparting to said core the form of a plurality of coaxial rings spaced from one another along the common axis of said shell.

6. A body according to claim 1, further comprising a pair of end caps secured to the opposite ends of said shell, thereby to make said body a closed deep submergence vessel capable of withstanding high external hydrostatic pressure.

7. A body according to claim 6, the wall structure of each of said end caps comprising a pair of concentric hemispherical shells each made of resin reinforced by short length filaments, the individual filament lengths in each end cap shell extending substantially normal to the inner and outer surfaces of that end cap shell, and a respective, rigid, low density core of polymeric material occupying the space between each pair of said end cap shells over the entire expanse thereof.

8. A body according to claim 7, said core in each of said end caps being made of syntactic foam.

9. A body according to claim 6, the wall structure of each of said end caps comprising a pair of concentric prolate spheroidlike shells each made of resin reinforced by short length filaments, the individual filament lengths in each end cap shell, extending substantially normal to the inner and outer surfaces of that end cap shell, and a respective, rigid, low density core of polymeric material occupying the space between each pair of said end cap shells over the entire expanse thereof.

10. A body according to claim 9, said core in each of said end caps being made of syntactic foam.